United States Patent Office 3,778,501
Patented Dec. 11, 1973

3,778,501
REGENERATION OF FLUE GAS DESULFURIZATION SORBENTS
Robert J. Lang, Watchung, N.J., Eugene L. Holt, Elmhurst, N.Y., and David N. Stoneback, Westfield, N.J., assignors to Esso Research and Engineering Company
No Drawing. Continuation-in-part of abandoned application Ser. No. 790,844, Jan. 13, 1969. This application June 4, 1971, Ser. No. 150,173
Int. Cl. B01d 53/34
U.S. Cl. 423—244         5 Claims

ABSTRACT OF THE DISCLOSURE

Solid sorbents for the removal of sulfur dioxide from gases, such as copper oxide on a suitable carrier material such as alumina, are regenerated with a regeneration gas comprising hydrogen and about 50 to 95% by volume of steam. The presence of steam in the amounts indicated reduces the amount of sulfide formation and thereby increases the capacity of the sorbent and improves the utilization of reducing gas.

CROSS-REFERENCE TO RELATED APPLICATION

This application is a continuation-in-part of our copending application Ser. No. 790,844, filed Jan. 13, 1969, and now abandoned.

BACKGROUND OF THE INVENTION

This invention relates to processes for removal of sulfur dioxide from gases such as flue gas, and more particularly to processes for the regeneration of solid sorbents used in the removal of sulfur dioxide.

Some high sulfur coals and fuel oils which are burned in the boiler-generator units of electrical power stations and other industrial furnaces are the source of air pollution problems in heavily populated areas. The flue gas from these fuels contains $SO_2$ and $SO_3$, and efforts are being made to develop efficient processes for removing these materials. While the problem is generally greater for electric power plants, it is also a problem for other industries where heat must be generated in a boiler, in ore smelting, and in other situations in which gases containing sulfur dioxide are produced.

It is known that sulfur dioxide can be removed from flue gas by contacting the flue gas with a suitable solid sorbent. A preferred sorbent for the removal of sulfur dioxide from flue gas is a sorbent comprising copper, copper oxide or mixture thereof supported on alumina. Flue gas desulfurization processes using copper on alumina sorbents are described, for example, in British Patent No. 1,089,716 and in U.S. Pat. No. 3,501,897.

The copper on alumina sorbent is used in a cyclic regenerative process in which the $SO_2$ content of the flue gas reacts with the copper oxide of the sorbent in one step, followed by regeneration of the sorbent with simultaneous desorption of $SO_2$.

Flue gas from a combustion source, which ordinarily contains both sulfur dioxide and oxygen, is contacted with a bed of the solid sorbent during the desulfurization step of the cycle. The copper is oxidized quantitatively to CuO, which in turn is partially sulfated to copper sulfate. Equations 1 and 2 below are representative of the reactions taking place during this step of the cycle.

(1) $Cu + \frac{1}{2} O_2 \rightarrow CuO$ (2) $CuO + \frac{1}{2} O_2 + SO_2 \rightarrow CuSO_4$ When the sulfur dioxide concentration in the exit gas exceeds a predetermined amount, the sorbent bed is taken off stream and regenerated by passage of a reducing gas in contact with the bed. Reducing gases known in the art include hydrogen, carbon monoxide, and mixtures thereof, and low molecular weight hydrocarbons such as methane, ethane, propane, butane, and natural gas. Regeneration takes place at approximately the same temperature as desulfurization. The regeneration off gas contains $SO_2$ in concentrations substantially higher than the concentration of $SO_2$ in the flue gas. This sulfur dioxide can be worked up to either sulfur or sulfuric acid. Simultaneously with the desorption of sulfur dioxide, the sorbent is regenerated with the decomposition of copper sulfate into copper oxide, metallic copper, copper sulfide, or mixtures thereof, as shown by Equations 3, 4 and 5 below.

(3) $CuSO_4 + H_2 \rightarrow CuO + SO_2 + H_2O$ (4) $CuO + H_2 \rightarrow Cu + H_2O$ (5) $CuSO_4 + 4H_2 \rightarrow CuS + 4H_2O$ Hydrogen is the most active of the reducing gases enumerated above. It is highly desirable for its high activity an because, unlike the hydrocarbons, it does not cause the deposition of coke on the sorbent. Carbon monoxide is also active, although less so than hydrogen, and is also desirable because of the absence of coke deposition on the sorbent. However, one difficulty encountered in regeneration with hydrogen, carbon monoxide, or mixtures thereof, is that part of the copper sulfate is reduced to copper sulfide as shown by Equation 5, rather than to either copper oxide or metallic copper as shown by Equations 3 and 4. Formation of copper sulfide is undesirable for two reasons. First, a much larger quantity of reducing gas is required to reduce the copper sulfate to copper sulfide than is required to reduce copper sulfate to metallic copper. Addition of Equations 3 and 4 above shows that two moles of hydrogen are required to reduce copper sulfate to metallic copper, while Equation 5 shows that four moles of hydrogen are consumed in reducing copper sulfate to cupric sulfide. Secondly, copper sulfide has very little capacity for removing sulfur dioxide from flue gas. On a subsequent flue gas desulfurization cycle, copper sulfide is oxdized to copper sulfate according to Equation 6 below.

(6) $CuS + 2O_2 \rightarrow CuSO_4$

Copper sulfide has been illustrated as cupric sulfide in the above equations, although the sulfide formed on regeneration is probably a mixture of cuprous and cupric sulfides, and possibly a mixture in which cuprous sulfide predominates.

SUMMARY OF THE INVENTION

According to the present invention, it has been discovered that sulfide formation during the regeneration of flue gas desulfurization sorbents can be considerably diminished and the utilization of reducing gas markedly improved by using as the regeneration gas a mixture comprising a reducing gas and about 50 to about 95% by volume of steam. The reducing gas is either hydrogen, carbon monoxide, or a mixture thereof.

DETAILED DESCRIPTION OF THE INVENTION

In a complete operating cycle employing the regeneration procedure of the present invention, sulfur dioxide is removed from a gas mixture containing both sulfur dioxide and oxygen, such as flue gas, by passing the gas mixture in contact with a solid sorbent comprising a heavy metal, heavy metal oxide, or mixture thereof and a solid carrier material until sulfur dioxide breaks through into the exit gas. The heavy metal or metal oxide is at least partially sulfated in the process. The sorbent is then regenerated according to this invention by contacting the sorbent with a regeneration gas comprising a mixture of hydrogen, CO, or a mixture thereof, and about 50 to about 95% by volume of steam, as will be described in greater detail below. Sulfur dioxide is desorbed during regeneration. The concentration of sulfur dioxide in the regeneration off gas is substantially greater than the sulfur dioxide concentration in the incoming flue gas.

Sorbents comprising copper, copper oxide, or a mixture of the two on alumina are preferred in the practice of this invention. The copper on alumina sorbent used in the present invention may be of a type known in the art. Such a sorbent initially contains copper, copper oxide, or a mixture thereof supported on alumina or a high alumina material. The sorbents described in British Patent No. 1,089,716 are examples of suitable sorbents. Any adsorbent grade alumina or material of high alumina content may be used as the carrier according to this invention. Suitable carriers include natural clays, pretreated or not with acid, bauxite, synthetic alumina, and alumina-silica mixtures of high alumina content. The sorbent grade aluminas have a high surface area, usually over about 100 square meters per gram.

The sorbent can be prepared by known techniques. According to one method, the carrier material is impregnated with an aqueous solution of a copper salt and is then dried or calcined. The sorbent after calcination is in the form of copper oxide on the carrier. The copper oxide may be reduced to metallic copper if desired. Another method of sorbent preparation is to mix a copper compound in a carrier intimately through co-precipitation, with subsequent drying and calcining. The copper content of the sorbent may vary within wide limits. As a rule, it is at least 1% by weight, and preferably no more than about 25% by weight, of the sorbent, preferably about 2 to about 12% by weight of the sorbent (i.e., the weight of copper plus the weight of carrier).

The sorbent may be prepared in any desired physical form, such as pellets, extrudates, etc. In the case of pellets, the carrier may be preformed into the desired shape and then impregnated with the copper salt.

Regeneration is carried out according to the present invention by contacting the spent solid sorbent with a regeneration gas comprising (1) a reducing gas selected from the group consisting of hydrogen, carbon monoxide, and mixtures thereof, and (2) about 50 to about 95% by volume of steam. Applicants have discovered that sulfide formation is materially reduced and the capacity of the copper sorbent for removing sulfur dioxide from flue gas is materially increased by using a gas mixture which contains at least 50% by volume of steam for regeneration. As the percentage of steam in the regeneration gas is increased, the amount of sulfide formation is reduced. However, it is not desirable for economic considerations to use regeneration gases containing more than about 95% by volume steam, because of the excessive amount of gas required for regeneration when the volume percentage of steam exceeds this amount. Preferred regeneration gas mixtures contain from about 60% to about 85% by volume of steam. Gas mixtures containing less than about 60% by volume of steam are less desirable because of the greater sulfide formation. Gas mixtures containing more than about 85% by volume of steam are not optimum because of the large volume of regeneration gas required, even though sulfide formation is actually less than when regeneration gas mixtures containing 60 to 85% by volume steam are used.

The preferred reducing gas component in regeneration gases according to this invention is hydrogen. It is desirable for the volume percentage of hydrogen to be greater than the volume percentage of CO in a mixture containing both gases, since hydrogen has greater activity Regeneration gas according to this invention may also contain some inert gases, such as carbon dioxide. Carbon dioxide is normally present simply because of the process by which the regeneration gas is preferably made.

Preferred regeneration temperatures are in the range of about 600° to 900° F., which is about the same as the preferred flue gas desulfurization temperature. By conducting both desulfurization and regeneration at about the same temperatures, thermal shock, which materially shortens the life of the sorbent, is minimized.

The regeneration off gas contains sulfur dioxide, steam, unreacted hydrogen and/or carbon monoxide, plus other constituents, e.g., carbon dioxide, present in the regeneration gas. The off gas can be treated to convert the sulfur dioxide therein to sulfur or sulfuric acid.

The effectiveness of mixtures comprising hydrogen and steam for regeneration of sorbents cannot be explained strictly in terms of hydrogen concentration. While hydrogen-steam mixtures containing about 50 to 95% by volume and conversely about 5 to 50% by volume of hydrogen have been found highly effective in preventing sulfide formation, hydrogen-nitrogen mixtures of equal volume percentage hydrogen are less effective.

Regeneration gas for the present invention can be made by catalytically reforming methane with steam according to methods known in the art. The reformer effluent contains steam, hydrogen, carbon monoxide, carbon dioxide, and usually trace amounts of methane. The amounts of stream in the reformer effluent may be as much as about 40% by volume. Since a larger amount of steam is required in the regeneration of gas of the present invention, it is necessary either o add steam to the effluent gas or to use a greater than normal excess of steam in the catalytic converter. The former, of course, is preferable. The addition of steam to the reformer effluent not only brings the amount of steam in the gas up to that desired, but also is effective in reducing the gas temperature below the reformer effluent temperature, which is about 1500° F. When a regeneration gas substantially free of carbon monoxide, or having a higher ratio of $H_2$ to CO than the reformer effluent, is desired, the amount of hydrogen may be increased and the amount of CO correspondingly decreased by conventional water gas shift techniques. This represents a preferred mode of operation. The regeneration gas may contain trace amounts of methane which pass through the catalytic reformer unreacted. The water gas shift effluent, which contains over 50% by volume of steam, is adjusted to the desired regeneration gas inlet temperature of about 600° to about 900° F. as necessary and is passed without removal of any constituents therefrom to the flue gas desulfurization reactor.

Typical results of operations in accordance with the process of this invention are given in the following examples. These examples are merely illustrative and not limitative. In each example, a copper on alumina sorbent was oxidized and partially sulfated with simulated flue gas containing about 0.3% by volume of $SO_2$, about 0.8% by volume of oxygen, 13% by volume of $CO_2$, balance nitrogen (percentages on dry basis), and saturated with water at room temperature. The percentage of copper sulfated (i.e., converted to copper sulfate) in each run is given. Then the sorbents were regenerated with gas mixtures of various compositions as indicated in the tables. These gas mixtures include hydrogen-steam and carbon monoxide-steam regeneration gases according to this invention, as well as other gas mixtures given for the purpose of comparison. Regeneration conditions, i.e., gas inlet temperature and space velocity, are given in each example.

In each example, the number of moles of $SO_2$ desorbed per mole of reducing gas ($H_2$ or CO as the case may be) reacted, is given in the tables. Examples 1–4, describing the use of hydrogen as the reducing gas, also give the theoretical maximum ratio of moles of $SO_2$ desorbed per mole of hydrogen reacted, based on the assumption that hydrogen will quantitatively reduce any CuO present according to Equation 4. The maximum theoretical $SO_2/H_2$ mole ratio, based on complete sulfation of the sorbent, is 0.50. The theoretical $SO_2/H_2$ mole ratio is lower than 0.50 when the sorbent is only partially sulfated. Also given is the quotient of the actual $SO_2/H_2$ mole ratio. This quotient is a good measure of the extent of sulfide formation.

EXAMPLE 1

A sorbent consisting of 10 to 12% by weight copper on alumina was used to remove sulfur dioxide from flue gas, and the sorbent was regenerated by contacting it with various hydrogen-steam mixtures or with dry hydrogen. Results are indicated in Table I below.

similar to that used in Example 1. In each run, simulated flue gas was contacted with the sorbent, removing $SO_2$ therefrom and sulfating the sorbent to the extent indicated in Table III below. In comparison Run Nos. 1 and 2, the sorbent was regenerated with gas A, containing 37% by volume hydrogen, 5% carbon monoxide, 3% steam, and 55% nitrogen for 4 minutes at a total gas velocity of 3300 v./v./hr. or a reducing gas velocity (hydrogen plus carbon monoxide) of 1390 v./v./hr.; Run Nos. 3 and 4 were carried out according to this invention using as the regeneration gas a mixture of 25% by volume hydrogen and 75% by volume steam for 8 minutes at a total space velocity of 2000 v./v./hr. (hydrogen space velocity of 500 v./v./hr.). Results are shown in Table III below.

TABLE I

| Run No. | Percent of Cu sulfated | Regeneration | | | | Mols $SO_2$/mol $H_2$ | | Quotient, percent |
| | | Temp., °F. | Gas rate, v./v./hr. | | Vol. percent steam | Theoretical | Actual | |
| | | | $H_2$ | Steam | | | | |
| --- | --- | --- | --- | --- | --- | --- | --- | --- |
| 1 | 33 | 600 | 500 | 8,000 | 94 | 0.25 | 0.25 | 100 |
| 2 | 43 | 600 | 500 | 8,000 | 94 | 0.30 | 0.33 | 110 |
| 3 | 44 | 600 | 500 | 8,000 | 94 | 0.31 | 0.29 | 94 |
| 4 | 72 | 650 | 500 | 8,000 | 94 | 0.42 | 0.43 | 102 |
| 5 | 67 | 650 | 700 | 4,400 | 86 | 0.40 | 0.32 | 80 |
| 6 | 63 | 650 | 700 | 0 | 0 | 0.39 | 0.19 | 49 |
| 7 | 100 | 600 | 2,000 | 0 | 0 | 0.50 | 0.12 | 24 |

The above data show that excellent conversions of copper sulfate in the spent sorbent to copper, with little or no sulfide formation, were obtained in Run Nos. 1 to 4 using a regeneration gas containing 6% hydrogen and 94% steam at a hydrogen space velocity of 500 v./v./hr. These excellent conversions are indicated in the column heading "Quotient," since this heading represents the percentage of hydrogen which is actually consumed in reducing copper sulfate or copper oxide to metallic copper (based on the assumption that all copper oxide which is either present at the start of the regeneration cycle or formed during the regeneration cycle by copper sulfate decomposition is reduced to metallic copper) divided by the total quantity of hydrogen reacted. In Run No. 5, the quotient of 80% indicates that 80% of the copper sulfate undergoing reaction is converted back to metallic copper and 20% is converted to copper sulfide. Run Nos. 1–5 were conducted in accordance with the present invention. Whether the slightly poorer showing in Run No. 5 as compared to Run Nos. 1–4 is due to the lower percentage of steam or the higher hydrogen space velocity cannot be ascertained based on these data. Comparison Run Nos. 6 and 7 show a markedly poorer hydrogen utilization, whether based on the quantity of sulfur dioxide liberated or on the percentage of copper sulfate reduced to metallic copper.

EXAMPLE 2

A sorbent consisting of 8.4% by weight copper on alumina was sulfated to a high degree and then regenerated with mixtures of hydrogen and steam in various amounts. Run No. 1 is a comparison run, and Run Nos. 2 and 3 were carried out according to this invention. The following results were obtained shown in Table II.

TABLE III

| Run No. | Percent of Cu sulfated | Regeneration | | | Mols $SO_2$/mol $H_2$ | | Quotient, percent |
| | | Temp., °F. | Gas | Space velocity | Theoretical | Actual | |
| --- | --- | --- | --- | --- | --- | --- | --- |
| 1 | 49 | 600 | A | 3,300 | 0.33 | 0.23 | 70 |
| 2 | 56 | 600 | A | 3,300 | 0.36 | 0.25 | 70 |
| 3 | 44 | 600 | B | 2,000 | 0.31 | 0.21 | 95 |
| 4 | 44 | 600 | B | 2,000 | 0.31 | 0.33 | 108 |

NOTE.—A=37% $H_2$, 5% CO, 3% $H_2O$, 55% $N_2$ (all percent by volume), 4 min., 3,300 v./v./hr. total gas; B=25% $H_2$, 75% $H_2O$, 8 min., 2,000 v./v./hr. total gas.

As can be seen, the actual hydrogen utilization in Run Nos. 3 and 4, using a hydrogen-steam mixture, was virtually equal to the theoretical, indicating that there was little or no sulfide formation. In Run Nos. 1 and 2, on the other hand, hydrogen utilization was poorer, indicating that some sulfide formation probably took place. This indicates that steam is superior to nitrogen as a diluent in supressing sulfide formation.

EXAMPLE 4

A sorbent similar to that used in Example 1, containing 10–12% by weight of copper on alumina, was sulfated with simulated flue gas to the extent indicated in Table IV below. The sorbent was then regenerated with carbon monoxide, with and without added steam, in two separate runs. The carbon monoxide space velocity was the same in both runs, and the total space velocity was

TABLE II

| Run No. | Percent of Cu sulfated | Regeneration | | | | Mols $SO_2$/mol $H_2$ | | Quotient, percent |
| | | Temp., °F. | Gas rate, v./v./hr. | | Vol. percent steam | Theoretical | Actual | |
| | | | $H_2$ | Steam | | | | |
| --- | --- | --- | --- | --- | --- | --- | --- | --- |
| 1 | 85 | 700 | 2,000 | 1,360 | 40 | 0.46 | 0.30 | 65 |
| 2 | 84 | 700 | 2,000 | 4,060 | 67 | 0.46 | 0.41 | 89 |
| 3 | 83 | 700 | 2,000 | 7,600 | 79 | 0.45 | 0.50 | 111 |

EXAMPLE 3

A series of runs was carried out in order to show the effect of hydrogen-nitrogen mixtures versus hydrogen-steam mixtures on reducing gas utilization during regeneration. The sorbent was a 10–12% copper on alumina much greater in the run where steam was used. Results are shown in Table IV below.

TABLE IV

| Run No. | Percent of Cu sulfated | Regeneration | | | | |
| --- | --- | --- | --- | --- | --- | --- |
| | | Temp., °F. | Gas rate, v./v./hr. | | Vol. percent steam | Mols $SO_2$ per mol of CO |
| | | | CO | Steam | | |
| 1 | 34 | 700 | 2,000 | 0 | 0 | 0.34 |
| 2 | 39 | 700 | 2,000 | 8,000 | 80 | 0.59 |

The above results show that carbon monoxide utilization is much better when there is added steam (Run No. 2) than when pure dry carbon monoxide is used (Run No. 1).

It will be noted that the number of moles of $SO_2$ liberated per mole of CO undergoing reaction is greater than the ratio which would be obtained if hydrogen were used as the reducing gas. This is because carbon monoxide is a less active reducing agent than hydrogen. While hydrogen quantitatively reduces all copper oxide in the sorbent to metallic copper, it is probable that a portion of the copper oxide which is either present in the sorbent at the beginning of the regeneration cycle or formed during that cycle is not reduced to metallic copper when carbon monoxide is used as the reducing agent.

What is claimed is:

1. In a process for removing sulfur dioxide from a gas mixture containing sulfur dioxide and oxygen in which said gas mixture is contacted with a solid sorbent comprising copper, copper oxide or a mixture thereof supported on alumina to remove sulfur dioxide from said gas mixture and in which said sorbent is regenerated and sulfur dioxide is desorbed by contacting said sorbent with a regeneration gas, the improvement wherein said regeneration gas comprises hydrogen, carbon monoxide, or a mixture thereof, and about 50 to about 95% by volume steam.

2. A process according to claim 1 in which the inlet temperature of said regeneration gas is about 600° to about 900° F.

3. A process according to claim 1 in which the inlet temperature of said regeneration gas is about 650° to about 750° F.

4. A process according to claim 1 in which said regeneration gas comprises hydrogen and about 60 to about 85% by volume of steam.

5. A process according to claim 1 in which said regeneration gas is prepared by catalytically reforming a gaseous hydrocarbon and adding steam to the reformer effluent gas.

References Cited

UNITED STATES PATENTS

| 2,747,968 | 5/1956 | Pigache | 23—178 S |
| 3,411,865 | 11/1968 | Pijpers et al. | 23—25 |
| 3,428,575 | 2/1967 | Pijpers et al. | 23—25 |
| 3,501,897 | 3/1970 | Van Helden et al. | 23—25 |

EARL C. THOMAS, Primary Examiner

U.S. Cl. X.R.

423—541; 252—411